United States Patent
Raukola et al.

(10) Patent No.: US 9,808,999 B2
(45) Date of Patent: Nov. 7, 2017

(54) METHOD FOR ADJUSTING SIDEWALL UNIT AND SIDEWALL UNIT

(71) Applicant: Elematic Oy Ab, Akaa (FI)

(72) Inventors: Leena Raukola, Kangasala (FI); Lassi Järvinen, Valkeakoski (FI)

(73) Assignee: Elematic Oyj, Akaa (FI)

( * ) Notice: Subject to any disclaimer, the term of this patent is extended or adjusted under 35 U.S.C. 154(b) by 490 days.

(21) Appl. No.: 14/323,200

(22) Filed: Jul. 3, 2014

(65) Prior Publication Data

US 2015/0008604 A1 Jan. 8, 2015

(30) Foreign Application Priority Data

Jul. 3, 2013 (FI) .................................... 20135730

(51) Int. Cl.
*B29D 99/00* (2010.01)
*B28B 7/00* (2006.01)
*B28B 7/02* (2006.01)

(52) U.S. Cl.
CPC ............ *B29D 99/001* (2013.01); *B28B 7/002* (2013.01); *B28B 7/0017* (2013.01); *B28B 7/02* (2013.01)

(58) Field of Classification Search
CPC ........ B28B 7/0017; B28B 7/02; B29D 99/001
See application file for complete search history.

(56) References Cited

U.S. PATENT DOCUMENTS

| 3,822,979 A | 7/1974 | Webb |
| 5,393,033 A | 2/1995 | Wilson |
| 2003/0084632 A1 | 5/2003 | Takagi et al. |

FOREIGN PATENT DOCUMENTS

| AT | 409471 B | 8/2002 | |
| CN | 2513742 Y | 10/2002 | |
| CN | 2796988 Y | 7/2006 | |
| DE | 1224021 | 9/1966 | |
| DE | 2332007 | 1/1974 | |
| DE | 102011010931 | 3/2012 | |
| DE | 102011010931 A1 * | 3/2012 | ............... B28B 7/02 |
| EP | 1900489 A2 | 3/2008 | |
| GB | 1431907 | 4/1976 | |
| JP | 02293104 | 12/1990 | |
| NZ | 508434 | 3/2002 | |

(Continued)

OTHER PUBLICATIONS

Finnish Search Report for Patent App. No. 20135730.

(Continued)

*Primary Examiner* — James Sanders
(74) *Attorney, Agent, or Firm* — Dickinson Wright, PLLC

(57) ABSTRACT

A method for adjusting a sidewall unit (1) of a casting mold for concrete products, which sidewall unit comprises a support structure (2, 32, 42) and a mold surface plate (3, 3', 33, 43) fixed to the support structure, and which sidewall unit is fixed on a casting bed (8), wherein the mold surface plate comprises at least two portions (3, 3') extending along the length of the sidewall unit and connected to the support structure (2) and the vertical position of at least one of the portions (3), defined by orientation of the sidewall unit (1) fixed on a casting bed (8), is adjusted to form a gap (9) extending along the length of the sidewall unit between the portions. The invention also relates to such a sidewall unit.

4 Claims, 2 Drawing Sheets

(56) References Cited

FOREIGN PATENT DOCUMENTS

TW                250243          3/2006

OTHER PUBLICATIONS

European Search Report issued to EP14171912 corresponding EP Application dated Oct. 29, 2014.
Chinese Search Report dated Mar. 4, 2016 in the corresponding Chinese Patent Application No. 201410314728.1.
New Zealand Search Report for corresponding Patent App. No. 626347 dated Jun. 30, 2014.

* cited by examiner

METHOD FOR ADJUSTING SIDEWALL UNIT AND SIDEWALL UNIT

This application claims benefit of FI 20135730, filed 3 Jul. 2013, the entire contents of which are incorporated herein by reference for all purposes.

BACKGROUND

1. Field

The present disclosure relates to a detachable casting mold sidewall unit restricting a concrete element or product to be cast in the mold, which sidewall unit comprises a support structure and a mold surface plate. More precisely the present disclosure relates to a method for adjusting such a sidewall unit and to such a sidewall unit.

2. Description of Related Art

When manufacturing prefabricated concrete elements, the elements are cast in an element factory in molds that can be vertical molds, such as battery molds, or horizontal molds, such as table molds and tilting molds. For assembling the molds, there are generally used detachable sidewall units that are attached to the mold surface, either horizontal or vertical surface, by means of magnets. Some of the sidewalls or sidewall units of the casting mold may also be fixedly connected, by bolts or welding, or connected through hinges to the mold, generally at the edges of the mold surface.

When using horizontal molds, such as table molds or tilting molds, the manufacturing process is started by first building on the casting table a mold that defines the measures of the product to be cast. Generally this is nowadays carried out by building the mold on a metallic tiltable casting table of mold sidewall units that are attached by means of magnets. When the mold defining the external measures of the mold is finished, inside the mold there are, when necessary, respectively formed areas bordered by sidewall units, for example for windows, doors or other corresponding allocations defining the casting area of the cast product. Moreover, when necessary, various devices are placed on the casting table inside the mold for shaping the outer surface of the cast product or for forming the required allocations on the outer surface, such as cardboard, provided with surface retarder, that is set on the casting table when casting graphic concrete. At the final stage of preparing the mold, it is provided with the necessary reinforcements, whereafter concrete mix is poured in the mold.

For pouring concrete mix in a mold, there is generally used a concrete mix casting arrangement moving above the mold that feeds concrete mix to the casting mold. When employing a tilting mold, this casting of concrete mix in the mold takes place from a casting arrangement placed above the casting table or brought above the casting table. When casting in a circulating mold line, the casting mold is generally brought to a vibrator station provided with casting equipment, in which vibrator station the concrete mix is poured in the mold.

Possibly already during the casting of the concrete mix, but not later than after the concrete mix is poured in the mold, the mold filled with concrete mix is vibrated for compacting the concrete mix and for ensuring that the mold is properly filled. When using tilting molds, said vibration is realized for example by intermediation of vibrators placed under the casting table, and in a circulating mold line in a vibrator station where the concrete mix is poured in the mold, said vibrator station being provided with vibrators for vibrating the casting mold.

After the cast concrete product is cured, the product is in the case of a tilting mold removed from the casting mold by disassembling part of the mold, by tilting the casting table and by lifting the product away from the casting table by means of lifting loops or lugs provided in the product. In a circulating mold line, the mold is transferred to a separate tilting station for removing the cast concrete product from the mold.

Presently robots are used more frequently in furnishing horizontal casting molds of prefabricated concrete elements and products. In the casting mold assembly step said furnishing robots generally fetch the detachable sidewall units from storage and set them on predetermined spots on the casting table. After setting each detachable sidewall unit in place, the furnishing robot locks the sidewall unit in place by activating the fastening magnets fixing the sidewall unit, either part of said magnets or all at the same time. Typically detachable sidewall units to be set in place by furnishing robots are provided with fastening magnet units located inside the sidewall units, said fastening magnet units being operable through the top surface of the sidewall unit, typically by intermediation of a control pin extending upwardly from the top surface.

Detachable mold sidewall units generally comprise a mold surface plate defining a mold surface setting against the product to be cast, and a suitable support structure for supporting the mold surface plate against the pressure caused by the concrete mass cast in the mold. The mold surface plate is fixed to the supports structure in suitable way and the height of the mold surface plate generally must substantially be equal, and the height of the support structure may not exceed, the thickness of the product to be cast, and so that required surface finishing may be carried out to the fresh uncured concrete element without hindrances. This means that used mold sidewall units need to be changed or their height adjusted when the thickness of the concrete element to be cast changes.

Patent publication EP 1 900 489 B1 discloses a sidewall construction where the support structure is formed from two horizontally extending aluminum profiles and at least one vertically extending aluminum profile, which vertically extending aluminum profile is located between the horizontally extending aluminum profiles and connected to the horizontally extending profiles with coarse threaded screws. This way the height of the supports structure of the sidewall construction can be changed by changing the length of the vertically extending aluminum profiles.

Another known solution to be used especially with furnishing robots is to form the sidewalls or sidewall units from a plurality of smaller elements or parts that can be stacked and fixed on top of each other. This way the height of the sidewall can be adjusted by adding or removing parts from the stack forming the sidewall. This solution, however, is somewhat slow, since the robot needs to retrieve several parts to be located at the same place on the casting bed or table. This solution is also uneconomical, since in order to achieve the required set heights of sidewalls for different thicknesses of products to be cast, different thicknesses or heights of parts forming the sidewalls are required, which increases the amount of sidewall parts needed in the casting processes.

The embodiments of the present invention provide easily adjustable mold sidewall unit for casting concrete products, the sidewall unit comprising a support structure and a mold surface plate fixed to the support structure, where the mold surface plate is fixed vertically adjustably to the support structure, so that the same sidewall unit can be used for different product heights by simply moving and adjusting the mold surface plate setting against the product to be cast in vertical direction in relation to the support structure of the sidewall unit. The vertical orientation in the present invention is defined in the situation when the sidewall unit is fixed onto the casting bed, such as on the top surface of a casting table.

The mold surface plate of the sidewall unit of the invention comprises at least two portions extending along the length of the sidewall unit and connected to the support structure, and the vertical position of at least one of the portions is adjusted to form a gap between the portions, which gap also extends along the length of the sidewall unit. This embodiment can be used for casting concrete wall elements, which include an insulation layer, and the gap in the sidewall unit is placed in the area of the insulation layer or layers.

In embodiments of the present invention the mold surface plate adjustment may be done before or after the mold sidewall unit is placed and/or fixed on the casting bed.

In embodiments of the present invention the support structure of the sidewall unit may also be height adjustable, so that the support structure can be adjusted to correspond the mold surface plate adjustment.

The sidewall unit of the invention is advantageously a detachable sidewall unit, which is fixed in the casting bed with at least one magnet. The magnet used in the fixing may be a fixed part of the sidewall unit or it may be a separate magnet unit. Alternative detachable fixing means may also be utilized.

The sidewall unit of the invention is advantageously used with a furnishing robot, whereby the furnishing robot carries out the required mold surface plate adjustments.

More precisely the features defining a method according to an embodiment of the present invention are presented as a A method for adjusting a sidewall unit (1) of a casting mold for concrete products, which sidewall unit comprises a support structure (2, 32, 42) and a mold surface plate (3, 3', 33, 43) fixed to the support structure, and which sidewall unit is fixed on a casting bed (8), characterized in that the mold surface plate comprises at least two portions (3, 3') extending along the length of the sidewall unit and connected to the support structure (2) and the vertical position of at least one of the portions (3), defined by orientation of the sidewall unit (1) fixed on a casting bed (8), is adjusted to form a gap (9) extending along the length of the sidewall unit between the portions.

The features defining a sidewall unit according to an embodiment of the present invention are presented as sidewall unit (1) of a casting mold for concrete products, which sidewall unit comprises a support structure (2, 32, 42) and a mold surface plate (3, 3', 33, 43) fixed to the support structure, characterized in that the mold surface plate comprises at least two portions (3, 3') extending along the length of the sidewall unit, at least one of the portions (3) is fixed vertically adjustably, in the orientation of a sidewall unit (1) fixed on a casting bed (8), to the support structure (2), and a gap (9) extending along the length of the sidewall unit separates at least two of the portions. Other advantageous features and embodiments of the invention are disclosed herein.

BRIEF DESCRIPTION OF DRAWINGS

Exemplifying embodiments of the invention and their advantages are explained in greater detail below in the sense of example and with reference to accompanying drawings, where.

DETAILED DESCRIPTION OF SPECIFIC EMBODIMENTS

Figure 1:
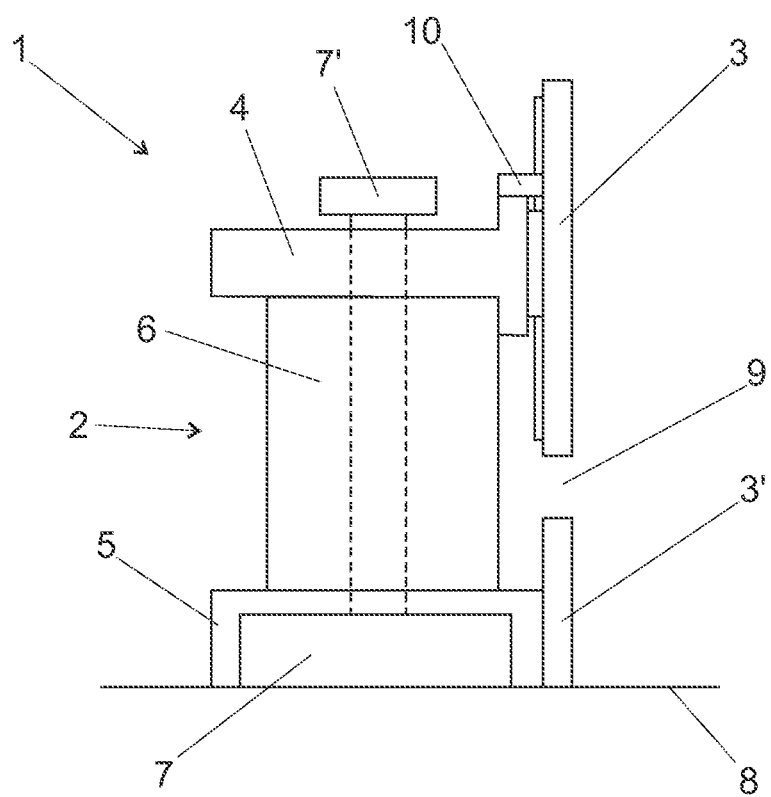
FIG. 1 shows schematically a side view of a sidewall unit according to an embodiment of the invention.

FIG. 1 shows schematically from side a detachable sidewall unit 1 according to an embodiment of the present invention as a side view, which sidewall unit comprises a support structure 2, and a mold surface plate consisting of two horizontally extending portions 3, 3' fixed to the support structure.

In this embodiment the support structure 2 comprises two horizontal aluminum profiles 4 and 5 extending along the length of the sidewall unit, which horizontal aluminum profiles are connected to each other with a plurality of vertical aluminum profiles 6 located between the horizontal aluminum profiles. This type of support structure is known from a patent publication EP 1 900 489 B1. Inside the lower horizontal aluminum profile 5 of the support structure 2 is located a magnet unit 7 for fixing the sidewall unit 1 at its place on a casting bed 8, which can be for example a casting table. With magnet operating means 7' the magnet unit 7 is movable inside the lower horizontal aluminum profile 5 to a lower position, where the magnet unit is set against the casting bed 8 and the sidewall unit 1 is fixed at its place, and to an upper position, where the magnet unit is a distance away from the surface of the casting bed and the sidewall unit is detached from the casting bed.

In the present invention the support structure 2 may alternatively be formed from a single horizontal aluminum profile extending along the length of the sidewall unit instead of plurality of profiles connected to each other to form the support structure.

The portions 3, 3' of the mold surface plate are connected to the support structure 2 of the sidewall unit 1 so, that the lower portion 3' is fixed immovably to the lower horizontal aluminum profile 5, and the upper portion 3 is connected vertically movably in the upper horizontal aluminum profile 4. The sides of portions 3, 3' of the mold surface plate setting against the concrete product to be cast are located in a substantially same vertical plane and extend substantially horizontally along the length of the sidewall unit 1.

Between the horizontally extending portions 3, 3' of the mold surface plate there is a gap 9, which gap extends also horizontally along the length of the sidewall unit 1 separating the portions of the mold surface plate along the whole length of the sidewall unit. The vertical dimensions of portions 3, 3' are selected so, that the gap between them is located on the area of insulation layer in the concrete product to be cast, such as an insulated wall element, for example. Further, the vertical dimension of the upper portion 3 is selected so, that by moving it vertically to different positions suitable amount of different product thicknesses can be cast with the same sidewall unit.

In this embodiment the upper horizontal aluminum profile 5 of the support structure 2 is equipped with a locking member 10. The locking member 10 keeps the upper portion 3 of the mold surface plate at its set position after it is vertically adjusted in its proper vertical position. In this embodiment the locking member 10 is a suitable magnet set against the metallic mold surface plate portion 3, or alternatively against metallic part connected to the non-metallic mold surface plate, for example. The magnet allows the portion 3 to be moved vertically, but keeps the portion 3 at its set place when the adjustment is done. Alternatively the magnet may be movably connected to the horizontal aluminum profile so it can be detached before vertically adjusting the portion 3, and once the adjustment is done, it can be reattached to the portion 3 of the mold surface plate to keep the portion at its adjusted vertical position.

Instead of a magnet, the locking member 10 may also be a metal peg or pin or other suitable member, that can be fitted in a hole or a notch formed in the back surface of the upper portion 3 of the mold surface plate, for example. The locations of the said holes or notches in upper portion 3 correspond to the standard heights of the sidewall unit for casting concrete products with standard thicknesses. This way the position of the upper portion 3 of the mold surface plate can easily and accurately be changed when thickness of the cast product is changed.

Figure 2:
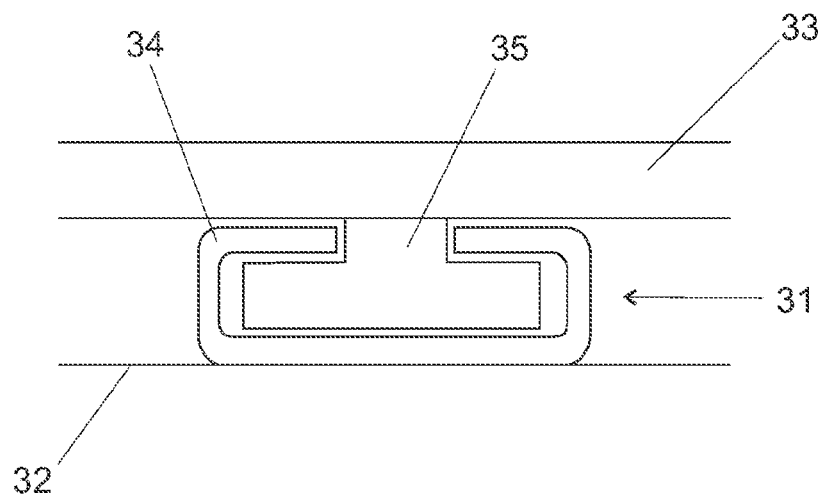
FIG. 2 shows schematically a top view of a vertically adjustable connection between a support structure and a mold surface plate of a sidewall unit of the invention.

FIG. 2 shows schematically a top view of an example of a vertically adjustable connection 31 between a support structure 32 and a mold surface plate portion 33 of a sidewall unit of the invention.

As can be seen from FIG. 2, the vertically adjustable connection 31 is formed by two vertically extending profiles 34 and 35, which are in substantially form-closed connection in all other directions except in vertical direction.

With a tight fitting it is possible to create enough friction between the profiles 34 and 35 so that the connection will hold the mold surface plate portion 33 at its vertical position without any separate locking member, and still allow the vertical position to be changed or adjusted with a small additional force.

Figure 3:
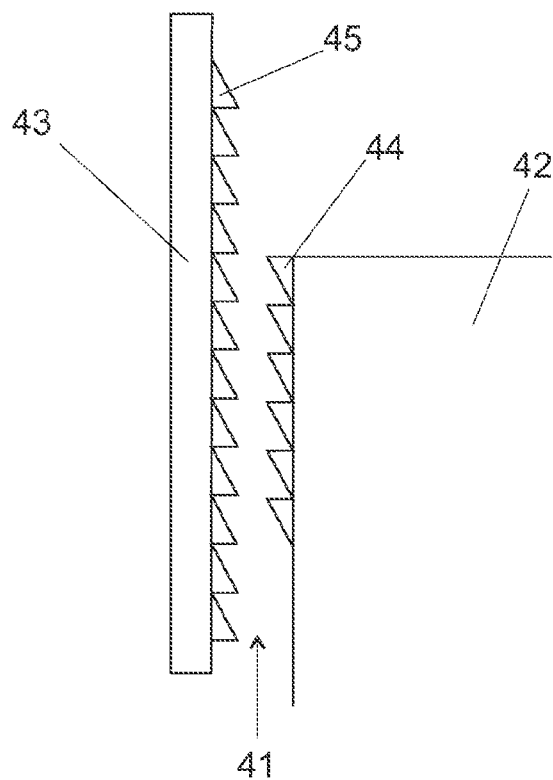
FIG. 3 shows schematically a side view of an alternative vertically adjustable connection between a support structure and a mold surface plate of a sidewall of the invention.

FIG. 3 shows schematically a side view of an alternative vertically adjustable connection 41 between a support structure 42 and a mold surface plate portion 43 of a sidewall of the invention. In the figure the mold surface plate portion 43 is shown a distance away from the support structure 42.

The vertically adjustable connection 41 is in this embodiment formed with a serrated protrusion 44 formed on a front surface of the support structure 42 and with a mating serrated protrusion 45 formed on a back surface of the mold surface plate portion 43.

In the embodiment of FIG. 3 the serrated protrusions 44 and 45 may be kept against each other with magnets or with other suitable means, for example, until the pressure of the cast concrete mass presses the mold surface plate portion 43 against the supports structure 42.

Alternatively the serrated protrusions 44 and 45 may be replaced with other type of suitable protrusions or with suitable protrusions and cavities, formed on either or both of the front surface of the support structure 42 and the back surface of the mold surface plate portion 43, in order to achieve the vertical adjustment of the present invention.

The specific exemplifying embodiments of the invention shown in the figures and discussed above should not be construed as limiting. A person skilled in the art can amend and modify the embodiments of the sidewall unit of the invention described above in many evident ways within scope of the attached claims. Thus the invention is not limited merely to the embodiments described above.

The invention claimed is:

1. A sidewall unit of a casting mold for concrete products, which sidewall unit comprises a support structure, a mold surface plate fixed to the support structure, wherein the mold surface plate comprises at least two portions extending along the length of the sidewall unit, wherein at least one of the portions is fixed vertically adjustably, in the orientation of a sidewall unit fixed on a casting bed, to the support structure, and a gap extending along the length of the sidewall unit separates at least two of the portions, wherein respective sides of the at least two portions facing concrete product are substantially vertically co-planar.

2. The sidewall unit according to claim 1, wherein the support structure is height adjustable.

3. The sidewall unit according to claim 1, wherein the sidewall unit further comprises at least one magnet for fixing the sidewall unit on a casting bed.

4. The sidewall unit according to claim 1, wherein the support structure further comprises means for locking the vertically adjustable portion or portions at a set vertical position.

* * * * *